(12) United States Patent
Bhattarai et al.

(10) Patent No.: US 8,655,532 B2
(45) Date of Patent: Feb. 18, 2014

(54) SYSTEM AND METHOD FOR OPERATING A HYBRID VEHICLE

(75) Inventors: Birendra P. Bhattarai, Novi, MI (US); Kevin A. Dietrich, Linden, MI (US); David W. Wright, Howell, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 13/173,258

(22) Filed: Jun. 30, 2011

(65) Prior Publication Data

US 2013/0006458 A1  Jan. 3, 2013

(51) Int. Cl.
*B60L 11/00* (2006.01)

(52) U.S. Cl.
USPC ................ 701/22; 701/54; 701/65

(58) Field of Classification Search
USPC ......... 701/22, 54; 180/65.265, 65.285, 65.29; 320/132
See application file for complete search history.

(56) References Cited

U.S. PATENT DOCUMENTS

| | | | | |
|---|---|---|---|---|
| 6,344,732 | B2 * | 2/2002 | Suzuki | 320/132 |
| 6,507,127 | B1 * | 1/2003 | Amano et al. | 290/40 C |
| 2008/0262668 | A1 * | 10/2008 | Yamada | 701/22 |

* cited by examiner

*Primary Examiner* — James P Trammell
*Assistant Examiner* — Jerrah Edwards
(74) *Attorney, Agent, or Firm* — Quinn Law Group, PLLC

(57) ABSTRACT

A method of modifying the charging target for the state-of-charge (SOC) of a hybrid vehicle battery in response to a sudden power draw includes determining that the hybrid vehicle has entered a steep grade environment, adjusting a power management scheme of the hybrid vehicle from a standard charging mode to an aggressive charging mode, and operating the hybrid vehicle operated using the adjusted power management scheme. The charging target may include both an immediate charging target and an ultimate charging target, where the immediate charging target is less than the ultimate charging target, and where adjusting a power management scheme from a standard charging mode to an aggressive charging mode includes increasing the immediate charging target.

20 Claims, 3 Drawing Sheets

SYSTEM AND METHOD FOR OPERATING A HYBRID VEHICLE

TECHNICAL FIELD

The present invention generally relates to a hybrid vehicle and, more particularly, to a method for operating a hybrid vehicle in a mountainous or other environment where roads have significant grades or inclines.

BACKGROUND

Some hybrid vehicles use a primary power source for the majority of the vehicle's propulsion needs and supplement that with an auxiliary power source, as needed. Certain driving conditions, such as the steep inclines and declines sometimes found on mountain roads, can present unique challenges for hybrid vehicles.

For example, when a hybrid vehicle is attempting to climb a mountain road with a significant grade, the electric motor may exhaust or at least diminish much of the stored charge on the battery. If the state-of-charge (SOC) of the battery falls beneath a certain threshold, the hybrid vehicle may have to rely on an internal combustion engine to provide supplemental propulsion power. In order to accomplish this task without resulting in a significant reduction in power that is noticeable to the driver, the operational interaction between the electric motor and the internal combustion engine may need to be specifically tailored to environments such as these.

SUMMARY

A method of modifying the charging target for the state-of-charge (SOC) of a hybrid vehicle battery includes determining that the hybrid vehicle has entered a steep grade environment, adjusting a power management scheme of the hybrid vehicle from a standard charging mode to an aggressive charging mode, and operating the hybrid vehicle using the adjusted power management scheme.

The charging target may include both an immediate charging target and an ultimate charging target, wherein the immediate charging target is less than the ultimate charging target, and wherein adjusting a power management scheme from a standard charging mode to an aggressive charging mode includes increasing the immediate charging target. In an embodiment, the immediate charging target may be bounded by a maximum deviation from a battery state-of-charge (SOC), wherein the maximum deviation may be a "standard" maximum deviation when the power management scheme is in a standard charging mode. Additionally, the maximum deviation may be an "aggressive" maximum deviation when the power management scheme is in an aggressive charging mode, wherein the aggressive maximum deviation is larger than the standard maximum deviation.

In one configuration, the standard maximum deviation and the aggressive maximum deviation may be static values. In another configuration, however, the standard maximum deviation and the aggressive maximum deviation may be functions of vehicle speed, with each maximum deviation having a respective deviation profile, and wherein the aggressive maximum deviation profile is greater than or equal to the standard maximum deviation profile for all vehicle speeds.

The step of determining that the hybrid vehicle has entered a steep grade environment may include monitoring SOC of the hybrid vehicle battery while the hybrid vehicle is in a charging mode, detecting the presence of a peak in the SOC, recording a value corresponding to the SOC at the peak, and evaluating whether the SOC has fallen below the recorded value by a defined threshold.

The method may further include determining that the vehicle has exited the steep grade environment, and adjusting a power management scheme of the hybrid vehicle from an aggressive charging mode to a standard charging mode in response. In an embodiment, the method may determine that the vehicle has exited the steep grade environment by monitoring SOC of the hybrid vehicle battery, comparing the SOC of the hybrid vehicle battery to the recorded value corresponding to the SOC at the peak, and then determining that the vehicle has exited the steep grade environment if the SOC of the hybrid vehicle battery is greater than the recorded value.

Similarly, a hybrid vehicle may include a primary power source that has an electric motor and a battery, an auxiliary power source including an engine and a generator, and a control system including a hybrid control unit. The electric motor may be configured to use electrical energy stored in the battery to propel the hybrid vehicle, and the battery may have a state-of-charge (SOC) corresponding to the stored electrical charge within the battery. Within the auxiliary power source, the engine may be configured to drive the generator, and the generator configured to recharge the SOC of the battery.

The hybrid control unit of the control system may be configured to execute a power management scheme to manage the operation of the auxiliary power source that may maintain or increase the SOC of the battery via a closed-loop charging target. The control system may be further configured to determine whether the hybrid vehicle has entered a steep grade environment, adjust the power management scheme from a standard charging mode to an aggressive charging mode if the hybrid vehicle has entered a steep grade, and operate the auxiliary power source using the adjusted power management scheme. In an embodiment, the closed-loop charging target may include an immediate charging target and an ultimate charging target, wherein the immediate charging target is less than the ultimate charging target. Furthermore, adjusting a power management scheme from a standard charging mode to an aggressive charging mode may include increasing the immediate charging target.

The above features and advantages and other features and advantages of the present invention are readily apparent from the following detailed description of the best modes for carrying out the invention when taken in connection with the accompanying drawings.

DETAILED DESCRIPTION

Figure 1:
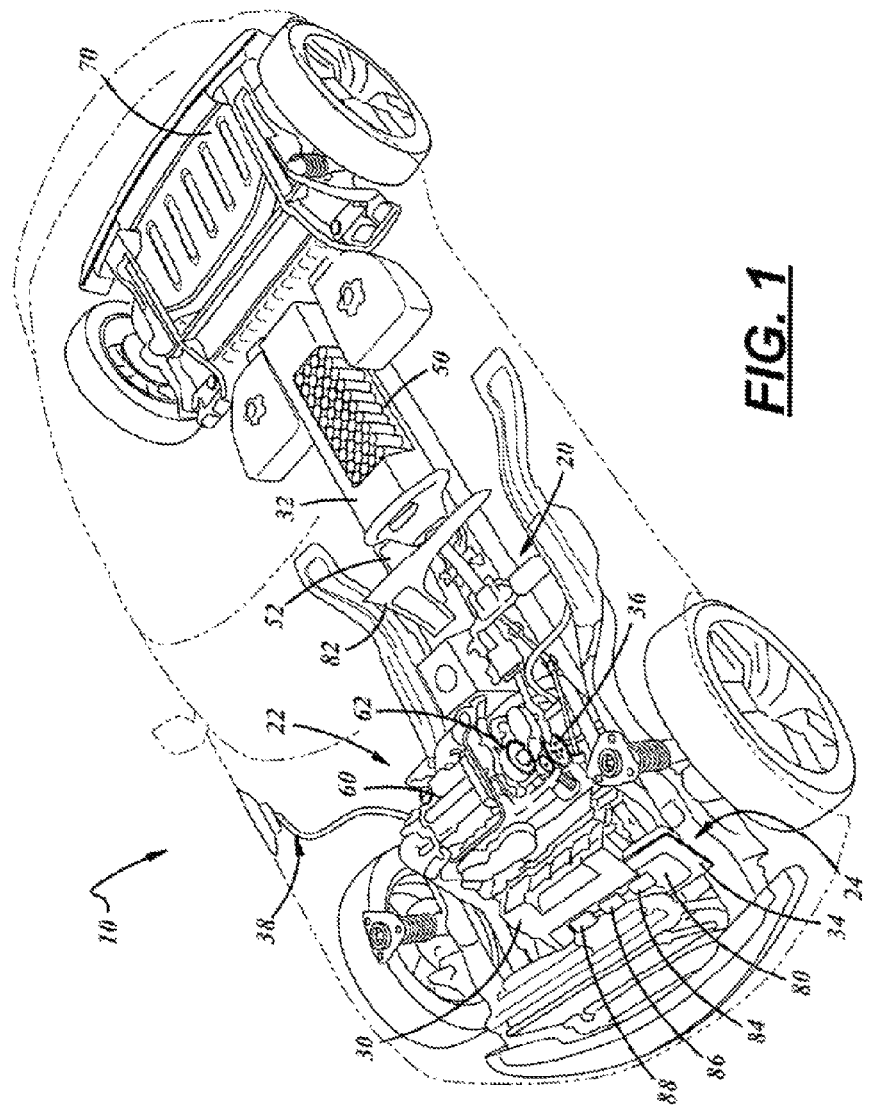
FIG. 1 is a perspective view of an embodiment of a hybrid vehicle.

Referring to the drawings, wherein like reference numerals are used to identify like or identical components in the various views, FIG. 1 schematically illustrates a hybrid vehicle 10 having a primary power source 20, an auxiliary power source 22, and a control system 24. A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended range electric vehicles (EREVs), two-mode hybrids, full hybrids, power-assist hybrids, mild hybrids, series hybrids, parallel hybrids, series-parallel hybrids, powersplit hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

As illustrated in FIG. 1, for example, the hybrid vehicle 10 may be a plug-in hybrid electric vehicle (PHEV) 10 having a range-extending series hybrid configuration, where a high voltage battery drives an electric motor for vehicle propulsion, and an internal combustion engine drives a generator for producing electrical energy. While the structure and operation of the PHEV 10 will be briefly discussed below, it is contemplated that other hybrid vehicles 10 may similarly be used.

As may be appreciated, the primary power source 20 may be largely responsible for vehicle propulsion and, according to an embodiment, may include a charger 30, a battery 32, an inverter/converter 34, and one or more electric motor(s) 36. In general, the battery charger 30 may receive electrical energy from one or more sources, convert and/or condition the electrical energy so that it is in a suitable form for the battery 32, and provide the converted electrical energy to the battery where it is stored. During vehicle propulsion, the battery 32 may provide electrical energy to the inverter/converter 34 where it is again converted, this time into a form suitable for electric motor 36, and provided to the electric motor 36 for driving the wheels of the vehicle. During regenerative braking, the electric motor 36 may act as a generator and provide electrical energy back to the battery 32 via the inverter/converter 34.

The charger 30 may receive electrical energy from a variety of sources, including external power sources (e.g., a standard AC electrical outlet, a remote charging station, an external generator, etc.) and internal power sources (e.g., an onboard generator). In the case of an external power source, the charger 30 may receive electrical energy through a suitable power coupling or charging cord 38 that connects the external power source to the charger. The charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

The battery 32 may store electrical energy that is used to drive the electric motor(s) 36, as well as to meet other electrical needs of the hybrid vehicle. According to an embodiment, the battery 32 may include a high-voltage battery pack 50 (e.g., 40V-600V) and a sensor unit 52. The high voltage battery pack 50 may include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. The battery 32 may be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

The inverter/converter 34 may act as an intermediary between the battery 32 and the electric motor(s) 36, as these devices are often times designed to function according to different operational parameters. For example, during vehicle propulsion the inverter/converter 34 can step-up the voltage from the battery 32 and convert the current from DC to AC in order to drive the electric motor(s) 36. During regenerative braking, however, the inverter/converter may step-down the voltage generated by a braking event and convert the current from AC to DC so that it can be properly stored by the battery. The inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the embodiment shown, the inverter and converter units are integrated into a single bidirectional device, however, other embodiments may also be possible. The inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

The electric motor(s) 36 may use electrical energy stored in the battery 32 and/or provided by the auxiliary power source 22 to drive the vehicle wheels, which, may in turn propel the hybrid vehicle 10. While FIG. 1 schematically depicts the electric motor 36 as a single discrete device, the electric motor 36 may be combined with a generator (i.e., a "motor/generator") or it may include multiple electric motors (e.g., separate motors for the front and rear wheels, separate motors for each wheel, separate motors for different functions, etc.). Thus, the following description only refers to a single electric motor 36 even though more than one electric motor may be used by the hybrid vehicle. The primary power source 20 should not be limited to any one particular type of electric motor, as many different motor types, sizes, technologies, etc. may be used. In one example, the electric motor 36 may include an AC motor (e.g., a three-phase AC induction motor, etc.) as well as a generator that can be used during regenerative braking. In other embodiments, the electric motor 36 may include AC or DC motors, brushed or brushless motors, permanent magnet motors, etc., may be connected in any number of different configurations, and may include any number of different components, like cooling features, sensors, control units and/or any other suitable components known in the art.

The auxiliary power source 22 may provide power in the event that battery 32 is depleted and, according to this particular embodiment, includes an engine 60 and a generator 62. In general, the engine 60 turns the generator 62, which in turn creates electrical energy that may recharge the battery 32, drive the electric motor 36, or do both. The specific allocation of electrical energy from the generator 62 may be influenced by the state of the battery (e.g., does the battery have a low state-of-charge (SOC), etc.), by performance demands on the motor (e.g., is the driver trying to accelerate the vehicle), etc. In another embodiment, the engine 60 is replaced with a fuel cell, a hydraulic or pneumatic system, or some other alternative energy supply that is capable of providing electrical energy to the hybrid vehicle.

The engine 60 may drive the generator 62 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, the engine 60 may be a small fuel-efficient engine (e.g., a small displacement, turbo-charged four-cylinder engine) that receives fuel from a fuel tank 70 and uses the mechanical output of the engine to turn a generator 62. The engine 60 may, however, be provided according to any number of different embodiments, may be connected in any number of different configurations (e.g., the engine 60 could be part of a parallel hybrid system where the engine is also mechanically coupled to the vehicle wheels instead of exclusively being used to generate electricity), and may include any number of different components, like sensors, control units and/or any other suitable components known in the art.

The generator 62 may be mechanically coupled to the engine 60 so that the mechanical output of the engine 60 causes the generator 62 to generate electrical energy that may be provided to the battery 32, to the electric motor 36, or to both. As with all of the exemplary components described herein, the generator 62 may include one of any number of suitable generators known in the art and is certainly not limited to any particular type. It is worth noting that the generator 62 may be provided according to any number of different embodiments (e.g., the generator of motor 36 and generator 62 may be combined into a single unit), may be connected in any number of different configurations, and may include any number of different components, like cooling units, sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

The control system 24 may be used to control, govern or otherwise manage certain operations or functions of the hybrid vehicle 10 and, according to one exemplary embodiment, may include a hybrid control unit 80 and a user interface 82. The hybrid control unit 80 may use stored algorithms or other electronic instructions to manage the activities of the various components and devices of both the primary power source 20 and the auxiliary power source 22 so that these two systems can seamlessly interact with one another and can react to a variety of changing conditions. Depending on the particular embodiment, the hybrid control unit 80 may be a stand-alone electronic module (e.g., a vehicle integrated control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities. In an embodiment, the hybrid control unit 80 may be at least partially responsible for performing certain aspects of the power management scheme described below.

Moreover, the hybrid control unit 80 may include any combination of electronic processing devices 84, memory devices 86, input/output (I/O) devices 88, and/or other known components, and may perform various control and/or communication related functions. For example, the processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Likewise, a memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method including certain aspects of the power management scheme—as well as any other electronic instructions and/or information needed for such tasks—may also be stored or otherwise maintained in memory device 86. The hybrid control unit 80 may be electronically connected to other vehicle devices and modules via an I/O device 88 and suitable connections, like a communications bus, so that they can interact as required. These are, of course, only some of the possible arrangements, functions and capabilities of hybrid control unit 80, as others are certainly possible.

The user interface 82 may be used to exchange information between a vehicle user and the vehicle, and may do so in a variety of ways. For instance, the user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, backend facility, etc.), to cite a few examples. In addition, the user interface 82 may be used to provide vehicle status, reports and/or other output to the vehicle user. The same devices and techniques for providing input, as well as others like a vehicle audio system and instrument panel, may also be used to provide output. Other user interfaces may be provided instead, as the exemplary ones shown and described herein represent only some of the possibilities. The present method may utilize any user interface to exchange information with the vehicle and is not limited to any particular type.

The illustrated hybrid vehicle 10 may include more, less or a different combination of elements, components, devices and/or modules than those illustrated and described here, as the present method is not limited to this particular embodiment. For example, the hybrid vehicle 10 may include parts such as: a hybrid transmission, a power-split device, a gear box, one or more clutches, a flywheel and/or other hybrid drivetrain components; a low-voltage electrical circuit or bus (e.g., standard 12V, 18V or 42V circuits), an accessory power module (APM), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
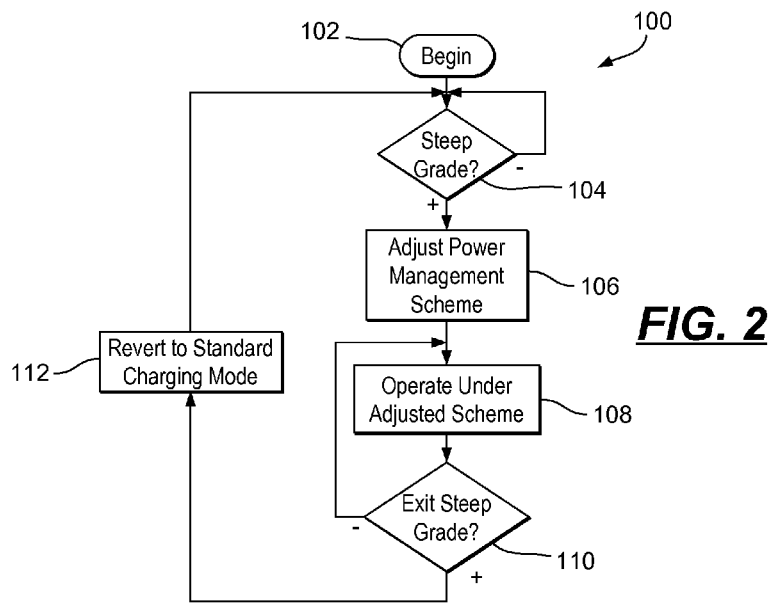
FIG. 2 is a flow diagram of a method for modifying the charging target for the state-of-charge (SOC) of a hybrid vehicle battery.

Referring to FIG. 2, an exemplary method 100 is provided for operating a hybrid vehicle 10 in a mountainous environment or other similar environments where roads have significant grades or inclines. It is sometimes difficult for a hybrid vehicle to maintain higher vehicle speeds when it is climbing a steep road with a severe incline or grade (e.g., roads with grades over 3%). For example, if the hybrid vehicle 10 is driving on a section of mountain road with an incline that ranges between 3%-10% for a considerable distance, in order to maintain a desired vehicle speed on such a steep section, the electric motor 36 may have to draw so much electrical energy from the battery 32 that the state-of-charge (SOC) of the battery 32 may rapidly decline. Such a rapid decline may occur even when the auxiliary power source 22 (i.e., engine 60 and generator 62) is running and providing electrical energy to the hybrid vehicle 10. If no remedial actions are taken and the SOC of the battery 32 continues to fall and dips below some minimum threshold (e.g., 15%), then the hybrid vehicle 10 may have to slow down or even stop in order for the auxiliary power source 22 to replenish some of the electrical energy. The method 100 takes certain precautionary measures regarding the generation, storage and/or usage of electrical energy so that this situation can be avoided or at least minimized.

As illustrated, the method 100 begins at step 102, which may, for example, include a key-on event, or activating a "mountain mode" feature in response to the receipt of an activation indication via the user interface 82, such as when a user depresses a "mountain mode" button or initiates "mountain mode" via a software interface. Once "mountain mode" is activated at 102, the hybrid control unit 80 then determines whether the hybrid vehicle 10 has entered a steep grade environment at 104. A "steep grade environment," as used herein, broadly includes any section of road or highway where the average grade is steep enough to warrant a specific power management scheme for the hybrid vehicle; although steep grade environments are not specifically limited to any certain grade or range of grades, they are oftentimes found on mountain roads where the average grade is greater than about 5% for some distance.

The hybrid control unit 80 may make the steep grade determination in step 104 by monitoring one or more performance-related parameters of the vehicle 10. For example, the hybrid control unit 80 may monitor the SOC of the battery 32 for an unexpected power draw, which may suggest that the electric motor 36 is working exceptionally hard to maintain a speed or acceleration. Alternatively, the control unit 80 may compare how hard the electric motor 36 is working (e.g., the torque output of the motor 36) with the effect that such work has on the performance of the vehicle (e.g., vehicle acceleration).

Figure 3:
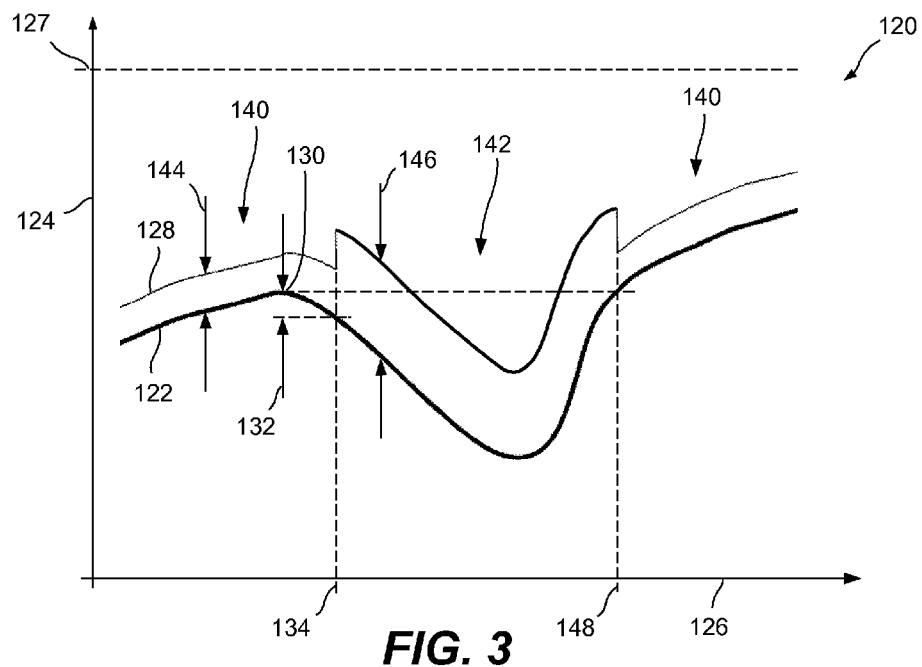
FIG. 3 is a graph of the state-of-charge (SOC), and charging target for a hybrid vehicle battery subject to the method of FIG. 2.

For example, as generally illustrated in the graph 120 provided in FIG. 3, the hybrid control unit 80 may monitor the SOC 122 of the battery 32 in order to glean some insight into how hard primary power source 20 is working. As shown, the SOC 122 of the hybrid vehicle battery 32 may be expressed as a percent of the total charging capacity 124, and may be viewed over time 126. When the vehicle is in a "charging mode," such as when the ultimate charging target 127 and/or immediate charging target 128 are above the actual SOC 122, any measurable decrease in SOC 122 (such as following the SOC peak 130) may suggest that hybrid vehicle 10 is in a steep grade environment or being driven particularly aggressive. More specifically, if an SOC peak 130 is detected, the hybrid controller unit 80 may determine that the vehicle is being driven in a steep grade environment (i.e., at step 104) by recording a value corresponding to the SOC 122 at the peak 130 and by evaluating whether the current SOC 122 has fallen below the recorded value by a defined threshold 132 (e.g., at time 134).

In an embodiment, the peak 130 may be detected using any combination of hardware and/or software peak detection. For example, an algorithm executed by the hybrid control unit 80 may initially monitor and record the SOC 122 of the battery 32. Subsequently (e.g., in the next cycle through the firmware code), the control unit 80 may compare an updated SOC value to the previously recorded value to determine whether the SOC has increased or decreased. If the SOC has decreased, the recorded value may be identified and maintained as the peak 130; otherwise, the recorded value may be updated to reflect the newly acquired SOC value. Alternatively, a peak-detector circuit may be used in conjunction with an analog signal that may be indicative of the SOC of the hybrid vehicle battery 32.

Referring again to FIG. 2, if the hybrid control unit 80 has determined that the hybrid vehicle 10 has entered a steep grade environment at 104, the method 100 may adjust the power management scheme that controls the primary power source and/or the auxiliary power source at step 106. For example, assuming the power management scheme is in a "charging mode," the method 100 may alter the behavior of the power management scheme to compensate for the sudden power draw by increasing the immediate charging target 128 for SOC of the battery 32. As may be understood, the immediate charging target 128 may be the closed loop set-point that the auxiliary power source 22 attempts to achieve and/or maintain. As the SOC increases due to the efforts of the auxiliary power source 22, the immediate charging target 128 may increase in a controlled manner until it approaches the ultimate charging target 127.

In an embodiment, at step 106, the hybrid control unit 80 may be configured to switch the immediate charging target 128 from a standard charging mode 140 to an aggressive charging mode 142. As illustrated in FIG. 3, when the ultimate charging target 127 is maintained substantially above the current SOC 122, the immediate charging target 128 may be capped at a maximum deviation from the current SOC 122. By capping the immediate charging target 128 at a maximum deviation, the hybrid control unit 80 will cause the auxiliary power source 22 (e.g., engine 60 and generator 62) to more gradually replenish the battery 32. By restricting the replenishment of the SOC, the engine may be prevented from driven at wide-open-throttle, which may be perceived as unpleasant to the vehicle passengers.

Initially (i.e., before a steep grade has been determined via step 104 at time 134), the vehicle 10 may be operated in a "standard" charging mode 140, which may bound the immediate charging target 128 using a "standard" maximum deviation 144. After the steep grade environment has been determined at time 134, the hybrid control unit 80 may switch to an "aggressive" charging mode 142, where the immediate charging target 128 may be bounded by a larger, "aggressive" maximum deviation 146. As may be appreciated, as the immediate charging target 128 trends further away from the actual SOC 122, the various control routines employed by the hybrid control unit 80 may cause the auxiliary power source 22 (e.g., engine 60 and generator 62) to more aggressively work to replenish the battery 32. In an embodiment, the "standard" maximum deviation 144 may be about 2% of the battery's capacity, while the "aggressive" maximum deviation 146 may be about 4.5%. Alternatively, the "aggressive" maximum deviation 146 may vary as function of the difference between the actual SOC 122 and the latched/recorded peak 130.

Figure 4:
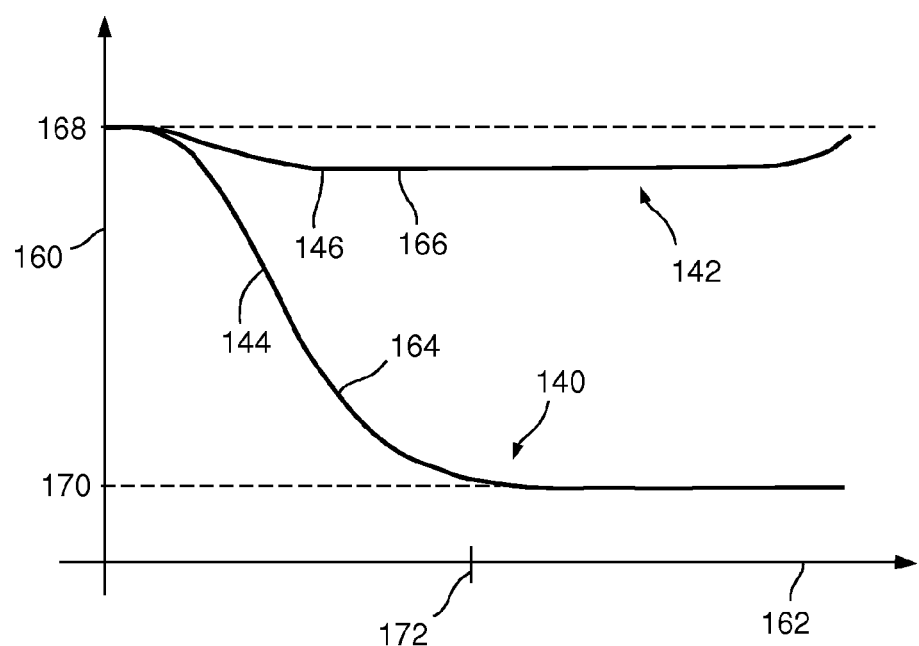
FIG. 4 is a plot of example maximum charging deviations that may be allowed while operating in an auxiliary power unit of a hybrid vehicle in a standard charging mode and aggressive charging mode.

As shown in FIG. 4, in an embodiment, the maximum charging target deviations 144, 146 (represented on the vertical axis 160) may vary as a function of vehicle speed 162. As illustrated, each charging mode 140, 142 may comprise a separate maximum deviation profile 164, 166, which may be separately used to bound the immediate charging target 128. As shown, the aggressive mode profile 166 may be greater than or equal to the standard mode profile 164 for all vehicle speeds 162. In one embodiment, the upper limit 168 on the maximum deviation may be about 5% and the lower limit 170 may be about 2%. Additionally, the inflection of the standard charging mode profile 164 may occur below a speed of about 45 miles per hour (about 72.4 kilometers per hour) 172. As such, once the profiles 164, 166 are established, the hybrid control unit 80 may access them, for example, via a lookup table, and alternate between them depending on the sensed terrain.

Referring again to FIG. 2, once the aggressive mode 142 is activated in step 106, the vehicle may be operated (step 108) using the adjusted power management scheme (i.e., applying the aggressive maximum deviation 146 to the immediate charging target 128) until the hybrid control unit 80 determines that it has suitably exited the steep grade environment at step 110. Once exited, the vehicle 10 may revert back to the "standard charging mode" 140 in step 112. As illustrated in FIG. 3, the hybrid control unit 80 may determine that the vehicle 10 has exited the steep grade environment (step 110) when the SOC 122 crosses above the previously set peak 130 (e.g., at time 148). Alternatively, in another embodiment, there may be a recovery threshold above the peak 130 that the SOC 122 may need to achieve before the method 100 determines that the vehicle 10 has exited the environment. Once the vehicle concludes that it has exited, however, the "standard" maximum deviation 144 may be re-applied to the immediate charging target 128 in step 112 (i.e., the hybrid control unit 80 may resume operation under the "standard" charging mode 140).

The method 100 illustrated and described with respect to FIG. 2 may be used as a stand-alone method of adjusting a hybrid vehicle 10 power management scheme, or may be nested within a broader power-management scheme. For example, the broader power management scheme may determine general periods of battery 32 charging/discharging and/or may be used to specify the ultimate charging target 127. The broader power management scheme may be implemented through electronic algorithms that are saved and executed by hybrid control unit 80 or some other suitable component, device, module, system, etc. As generally illustrated in FIG. 3, when the ultimate charging target 127 is substantially above the actual SOC 122, even with an applied maximum deviation 144; 146, the general trend will be for the SOC 122 to rise toward the ultimate target 127. The use of the "aggressive" charging mode 142 may merely curb excessive depletion of the SOC 122 of the battery 32 when a short-term steep draw is experienced, such as during a mountainous grade-climb. It is also contemplated that the auxiliary power source 22 may provide energy directly to the electric motor 36 while operating in the standard charging mode 140 and/or the aggressive charging mode 142.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A method of modifying the charging target for the state-of-charge (SOC) of a hybrid vehicle battery in response to a sudden power draw, the method comprising:
   detecting a drop in the SOC of the hybrid vehicle battery while the SOC is lower than both an immediate charging target and an ultimate charging target, wherein the drop is indicative of the hybrid vehicle driving up an incline;
   adjusting a power management scheme of the hybrid vehicle from a standard charging mode to an aggressive charging mode in response to the detected drop in the SOC;
   operating the hybrid vehicle using the adjusted power management scheme;
   wherein the immediate charging target is less than the ultimate charging target; and
   wherein adjusting a power management scheme from a standard charging mode to an aggressive charging mode includes increasing the immediate charging target.

2. The method of claim 1, wherein the immediate charging target is bounded by a maximum deviation from a battery state-of-charge (SOC);
   wherein the maximum deviation is a standard maximum deviation when the power management scheme is in a standard charging mode; the maximum deviation is an aggressive maximum deviation when the power management scheme is in an aggressive charging mode; and
   wherein the aggressive maximum deviation is larger than the standard maximum deviation.

3. The method of claim 2, wherein the standard maximum deviation and the aggressive maximum deviation are static values.

4. The method of claim 2, wherein the standard maximum deviation and the aggressive maximum deviation are functions of vehicle speed, with each maximum deviation having a respective deviation profile, and wherein the aggressive maximum deviation profile is greater than or equal to the standard maximum deviation profile for all vehicle speeds.

5. The method of claim 1, wherein detecting a drop in the SOC of the hybrid vehicle battery includes:
   monitoring the SOC of the hybrid vehicle battery while the hybrid vehicle is in a charging mode;
   detecting the presence of a peak in the SOC;
   recording a value corresponding to the SOC at the peak; and
   evaluating whether the SOC has fallen below the recorded value by a defined threshold.

6. The method of claim 5, wherein the charging mode includes the ultimate charging target being greater than the SOC.

7. The method of claim 5, further comprising determining that the vehicle has recovered from the drop in the SOC; and
   adjusting a power management scheme of the hybrid vehicle from an aggressive charging mode to a standard charging mode.

8. The method of claim 7, wherein determining that the vehicle has recovered from the drop in the SOC includes:
   monitoring SOC of the hybrid vehicle battery;
   comparing the SOC of the hybrid vehicle battery to the recorded value corresponding to the SOC at the peak; and determining that the vehicle has recovered from the drop in the SOC if the SOC of the hybrid vehicle battery is greater than the recorded value.

9. The method of claim 1, wherein the hybrid vehicle includes an auxiliary power source configured to charge the hybrid vehicle battery; and
wherein the immediate charging target is a closed loop SOC set-point that the auxiliary power source attempts to achieve or maintain.

10. The method of claim 1, wherein the drop in the SOC of the hybrid vehicle battery is caused by driving the hybrid vehicle up a steep grade.

11. A method of modifying the charging target for the state-of-charge (SOC) of a hybrid vehicle battery in response to a sudden power draw, the method comprising:
detecting a drop in the SOC of the hybrid vehicle battery while the SOC is lower than both an immediate charging target and an ultimate charging target;
adjusting a power management scheme of the hybrid vehicle from a standard charging mode to an aggressive charging mode;
operating the hybrid vehicle using the aggressive charging mode;
determining that the vehicle has recovered from the drop in the SOC; and
adjusting a power management scheme of the hybrid vehicle from an aggressive charging mode to a standard charging mode; and
wherein the immediate charging target is less than the ultimate charging target; and
wherein adjusting a power management scheme from a standard charging mode to an aggressive charging mode includes increasing the immediate charging target, and wherein adjusting a power management scheme from an aggressive charging mode to a standard charging mode includes decreasing the immediate charging target.

12. The method of claim 11, wherein detecting a drop in the SOC of the hybrid vehicle battery includes:
monitoring SOC of the hybrid vehicle battery while the hybrid vehicle is in a charging mode;
detecting the presence of a peak in the SOC;
recording a value corresponding to the SOC at the peak; and
evaluating whether the SOC has fallen below the recorded value by a defined threshold.

13. The method of claim 11, wherein determining that the vehicle has recovered from the drop in the SOC includes:
monitoring the SOC of the hybrid vehicle battery;
comparing the SOC of the hybrid vehicle battery to the recorded value corresponding to the SOC at the peak; and
determining that the vehicle has recovered from the drop in the SOC if the SOC of the hybrid vehicle battery is greater than the recorded value.

14. The method of claim 11, wherein the immediate charging target is bounded by a maximum deviation from a battery state-of-charge (SOC);
wherein the maximum deviation is a standard maximum deviation when the power management scheme is in a standard charging mode; the maximum deviation is an aggressive maximum deviation when the power management scheme is in an aggressive charging mode; and
wherein the aggressive maximum deviation is larger than the standard maximum deviation.

15. The method of claim 14, wherein the standard maximum deviation and the aggressive maximum deviation are static values.

16. The method of claim 14, wherein the standard maximum deviation and the aggressive maximum deviation are functions of vehicle speed, with each maximum deviation having a respective deviation profile, and wherein the aggressive maximum deviation profile is greater than or equal to the standard maximum deviation profile for all vehicle speeds.

17. The method of claim 11, wherein the drop in the SOC of the hybrid vehicle battery is caused by driving the hybrid vehicle up a steep grade.

18. A hybrid vehicle comprising:
a primary power source including an electric motor and a battery, the electric motor configured to use electrical energy stored in the battery to propel the hybrid vehicle, and the battery having a state-of-charge (SOC) corresponding to the stored electrical charge within the battery;
an auxiliary power source including an engine and a generator, the engine configured to drive the generator, and the generator configured to recharge the SOC of the battery; and
a control system including a hybrid control unit, the hybrid control unit configured to execute a power management scheme to manage the operation of the auxiliary power source to maintain or increase the SOC of the battery via a closed-loop charging target, the control system further configured to:
detect a drop in the SOC of the hybrid vehicle battery while the SOC is lower than the closed-loop charging target;
adjust the power management scheme from a standard charging mode to an aggressive charging mode in response to the detected drop in the SOC;
operate the auxiliary power source using the adjusted power management scheme; and
wherein the closed-loop charging target includes an immediate charging target and an ultimate charging target, the immediate charging target being less than the ultimate charging target; and
wherein adjusting a power management scheme from a standard charging mode to an aggressive charging mode includes increasing the immediate charging target.

19. The vehicle of claim 18, wherein the immediate charging target is bounded by a maximum deviation from a battery state-of-charge (SOC);
wherein the maximum deviation is a standard maximum deviation when the power management scheme is in a standard charging mode; the maximum deviation is an aggressive maximum deviation when the power management scheme is in an aggressive charging mode; and
wherein the aggressive maximum deviation is larger than the standard maximum deviation.

20. The vehicle of claim 19, wherein the standard maximum deviation and the aggressive maximum deviation are functions of the hybrid vehicle speed, with each maximum deviation having a respective deviation profile, and wherein the aggressive maximum deviation profile is greater than or equal to the standard maximum deviation profile for all vehicle speeds.

* * * * *